United States Patent [19]

Chi

[11] Patent Number: 5,473,764
[45] Date of Patent: Dec. 5, 1995

[54] MULTILEVEL INSTRUCTION CACHE

[75] Inventor: Chi-Hung Chi, Croton-on-Hudson, N.Y.

[73] Assignee: North American Philips Corporation, New York, N.Y.

[21] Appl. No.: 226,113

[22] Filed: Apr. 8, 1994

Related U.S. Application Data

[63] Continuation of Ser. No. 526,341, May 18, 1990, abandoned.

[51] Int. Cl.[6] .............................. G06F 9/26; G06F 12/00
[52] U.S. Cl. .............. 395/375; 364/243.42; 364/243.44; 364/263.2; 364/DIG. 1
[58] Field of Search ..................................... 395/375, 425, 395/250

[56] References Cited

U.S. PATENT DOCUMENTS

| | | |
|---|---|---|
| 4,430,712 | 2/1984 | Coulson et al. ........................ 364/300 |
| 4,503,501 | 3/1985 | Coulson et al. ........................ 364/300 |
| 4,521,850 | 6/1985 | Wilhite et al. ......................... 364/200 |
| 4,691,277 | 9/1987 | Kronstadt et al. ..................... 395/375 |
| 4,701,844 | 10/1987 | Thompson et al. ................... 364/200 |
| 4,783,736 | 11/1988 | Ziegler et al. ......................... 364/200 |
| 4,807,110 | 2/1989 | Pomerene et al. .................... 395/425 |
| 4,860,197 | 8/1989 | Langendorf et al. ................. 364/200 |
| 4,876,642 | 10/1989 | Gibson .................................. 395/375 |
| 4,881,170 | 11/1989 | Morisada .............................. 395/375 |
| 4,905,141 | 2/1990 | Brenza .................................. 364/200 |
| 4,933,837 | 6/1990 | Friedin ................................. 395/375 |
| 4,937,738 | 6/1990 | Uchiyama et al. ................... 364/200 |
| 4,943,908 | 7/1990 | Emma et al. ......................... 395/375 |
| 4,980,823 | 12/1990 | Liu ....................................... 395/375 |
| 5,093,778 | 3/1992 | Favor .................................... 395/375 |

FOREIGN PATENT DOCUMENTS 0118828  9/1984  European Pat. Off. .

OTHER PUBLICATIONS

B. Maytal et al. "Design Consideration for a gen. purpose Microp." *Computer,* vol. 22, No. 1, Jan. 1989, New York, pp. 66–76.

N. P. Joreppi "Improving Direct–Mapped Cache Performance by addition of small Fully Associative Cache and Prefetch Buffers" *The 17th Ann. Int. Symp.,* May 1990, pp. 364–375.

"AM29000 Streamlined Instruction Processor" User Manual, Advanced Micro Devices, 1988, pp. 4–1–4–8.

*Primary Examiner*—Parshotam S. Lall
*Assistant Examiner*—Ayni Mohamed
*Attorney, Agent, or Firm*—David Schreiber

[57] ABSTRACT

A cache memory for use between a processing unit and a main memory includes a prefetch buffer, a use buffer, and a head buffer. The prefetched buffer is a FIFO or LRU register which prefetches instructions from contiguous memory locations after the address specified by the program counter. The head buffer is a FIFO or LRU register which is utilized to store instructions from the tops of the program blocks which are accessed from main memory following recent cache misses. The use buffer is a relatively large, inexpensive buffer, preferably a directly mapped buffer, which stores recent hits from the prefetched buffer as well as selected instructions from main memory following cache misses.

31 Claims, 2 Drawing Sheets

MULTILEVEL INSTRUCTION CACHE

This is a continuation of application Ser. No. 07/526,341, filed May 18, 1990, now abandoned.

The invention relates to methods and systems for memory control in an electronic computer. More specifically, the invention relates to high speed buffer memories which interface between a central processing unit or multiprocessor processing element and the main memory of a computer.

RELATED APPLICATION

This invention is related to the methods and systems described in my patent applications Ser. No. 500,612, filed Mar. 27, 1990 for a System for Enhancing Instruction Cache Performance and Ser. No. 500,627 filed Mar. 27, 1990 for a Method for Compiling Computer Instructions for Increasing Instruction Cache Efficiency. These patent applications are incorporated herein, by reference, as background information.

BACKGROUND OF THE INVENTION

With advances in very large scale integration (VLSI) and supercomputing, a processor with computational capability similar to a supercomputer can be fabricated on a single chip. Although improvements in integrated circuit technology have resulted in significantly reduced gate delays, the speed and density of memory components have not been improved proportionately. Consequently, the overall performance of computers using these processors is usually limited by the memory system speed. Cache memories are used to bridge the gap between memory and processor speeds.

Cache memory is a high speed buffer memory which interfaces between a computer processing unit and main memory. As used herein, the term processing unit may refer to a central processing unit or to a multiprocessor processing element. The cache memory is intended to maintain quickly-accessible copies of data and instructions which are most likely to be needed by the processor. The cache memory can be much smaller than the main memory and it is therefore feasible to implement cache memory using faster, more expensive technology than can be economically used to implement a main memory. If the cache holds the appropriate data and instructions, the processing unit effectively sees only the fast cache access time, yet has the large main memory address space. Moreover, a properly managed cache system can have an indirect beneficial effect on computational efficiency by reducing system bus traffic.

A processing unit operates by sequentially executing a program of instructions which are stored in addressed locations of the main memory. Program blocks containing instructions for sequential execution are stored in contiguous memory addresses. The processing unit sequentially requests these instructions from memory via a program counter register which is incremented to point at a new instruction code during each instruction cycle. As long as the program flow remains sequential, cache memory operation is easily implemented by prefetching instruction codes from memory locations one or more lines ahead of the address held in the program counter. The prefetched instructions are then available in high speed cache memory when they are actually addressed by the processor and a "cache hit" is said to be achieved. However if the program flow requires a branch or loop to a non-sequential instruction address, the requested instruction code may not be present in the cache memory when it is requested by the processor and a "cache miss" is said to occur. When a cache miss occurs, processing must be suspended while the data is fetched from main memory.

The design goals for a good cache memory system are therefore: the cache hit ratio should be high so that the processing unit does not need to wait for instructions; the bus traffic should be as low as possible so that the chance for bus contention between data and instruction accesses is reduced (bus traffic is a particularly important performance bottleneck for single chip systems because the total physical IO pins of a chip are often limited); and efficient use should be made of chip area since it is always expensive and limited. The last criteria implies that the hardware complexity associated with the cache control should be as simple as possible.

DESCRIPTION OF THE PRIOR ART

The AM29000 32-bit Streamlined Instruction Processor User's Manual published in 1988 by Advanced Micro Devices, Inc. describes an instruction cache system wherein all instructions executed by a processor are either fetched from a branch target cache or are prefetched from an external instruction memory. When instructions are prefetched from the external memory, they are requested in advance to assist the timing of instruction accesses. The processor attempts to initiate the fetch for the next instruction during every cycle of the program.

Since instructions are requested in advance, based on a predicted need, it is possible that a prefetched instruction is not required for execution when the prefetch completes. To accommodate this possibility, the instruction fetch unit contains a four word instruction prefetch buffer which is circularly addressed and acts as a first-in-first-out queue for instructions. The processor also contains a branch target cache to allow fast access to instructions fetched non-sequentially. The target of a non-sequential fetch is in the branch target cache if a similar fetch to the same target occurred recently enough so that it has neither been replaced by the target of another non-sequential fetch or been invalidated by an intervening instruction. Whenever a non-sequential fetch occurs, via either a branch instruction, an interrupt, or a trap, the address for the fetch is presented to the branch target cache at the same time that it is passed to main memory.

SUMMARY OF THE INVENTION

In accordance with the invention, a cache memory is organized in three levels: 1) a prefetch buffer; 2) a head buffer; and 3) a use buffer.

The prefetch buffer operates in a conventional manner to prefetch instruction lines from sequential memory addresses ahead of the address determined by the program counter. It is preferably relatively small and organized as a first-in-first-out (FIFO) register. Instructions which are contained within blocks of sequentially executed code will usually result in cache hits on the prefetch buffer or on the use buffer.

The use buffer is a relatively large block of high speed cache memory with simple control hardware designed to make effective use of chip area. Typically, for example, the use buffer may be a direct mapped buffer with a large block size. Whenever the processor achieves a cache hit on the prefetch buffer the cache line which contains the referenced instruction is also transferred to the use buffer where it replaces a previously stored line. The use buffer provides economical, high speed access to recently executed instructions and is thus particularly efficient for executing code in repetitive program loops.

The head buffer is a relatively small buffer, organized as a FIFO register, which is used to store instructions from the top of program code blocks. If the processing unit misses a requested instruction in the cache buffers, the instruction is accessed from main memory via a high priority bus fetch. The relative address of the fetched instruction is tested, in accordance with a predetermined rule, and if the test is met, the instruction is stored in the head buffer. If the test is not met, the instruction is stored in the use buffer.

In accordance with the previously-referenced patent applications, it is possible to achieve increased cache efficiency by selectively compiling into programs, instructions which temporarily freeze cache contents for later access. In accordance with the invention, a multilevel cache may include hardware which responds to a freeze instruction code by inhibiting the writing of new data into the head buffer and use buffer. This feature can be used for example, to achieve efficient high speed execution of program loops.

In one embodiment of the invention the prefetch buffer operates to continuously prefetch instructions sequential to the program counter, without regard to the contents of the head buffer and use buffer.

In a second, more sophisticated embodiment of the invention, sequential prefetching is inhibited whenever it is determined that the instruction to be prefetched is already present in the head buffer or use buffer. System bus traffic is thereby proportionately reduced.

It is, therefore, an object of the invention to provide a high speed cache system which has a high probability of cache hits for sequential and non-sequential program execution and which minimizes system bus traffic while making efficient use of chip area.

DESCRIPTION OF THE DRAWINGS

The invention may be better understood by reference to the drawings in which.

DESCRIPTION OF THE PREFERRED EMBODIMENTS

Figure 1:
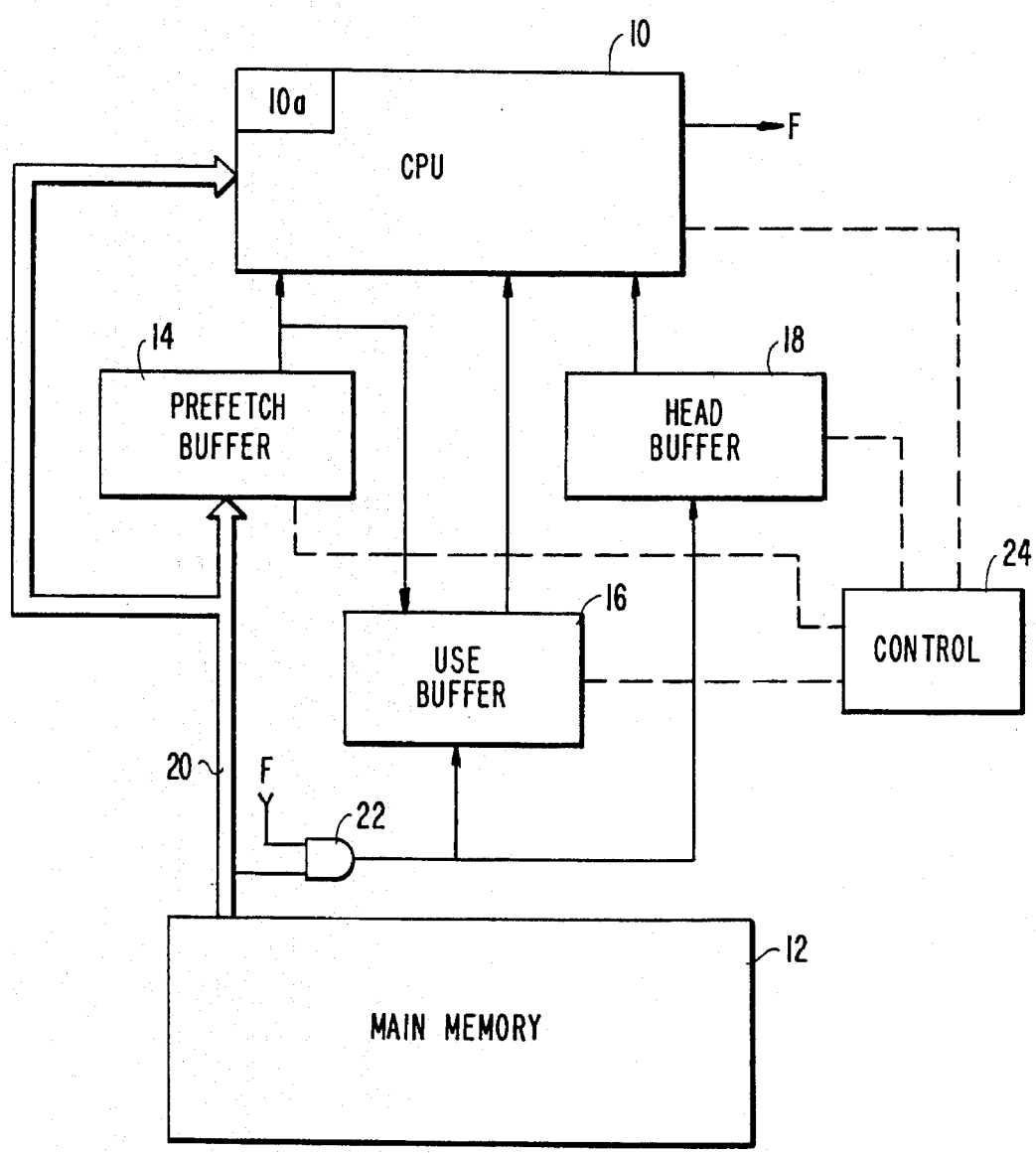
FIG. 1 illustrates the organization and instruction flow in a computer system which incorporates the invention.

FIG. 1 illustrates the organization and instruction flow in the cache memory of a computer system which incorporates the invention.

A processing unit 10, which may be part of a VLSI single chip microprocessor, includes a program counter register 10a whose contents are periodically updated to contain the address of the next program instruction to be executed by the processing unit. Program instructions are stored in a main memory unit 12 and typically comprise blocks of sequential instructions which are interrelated by non-sequential branch and loop instructions. The processor 10 may also be subject to hardware interrupts which cause the program to branch asynchronously to other program sequences which are also stored in the memory 12. Data is transferred between the main memory 12 and the processor unit 10 through a cache which includes a prefetch buffer 14, a use buffer 16 and a head buffer 18. Instructions are fetched from the main memory via a system bus 20 in accordance with protocols established by a cache control 24.

The prefetch buffer 14 is used to improve the cache hit ratio by prefetching instructions which are going to be referenced (or have a high probability of being referenced). It is organized as a FIFO register and typically has a relatively small size. The prefetch buffer accesses instructions from addresses which are sequentially ahead of the address contained in the program counter 10a via low priority transfers over the system bus 20. As described below, the prefetch buffer may continuously prefetch instructions, or, alternately, its operation may be inhibited by the control 24 in response to the contents of the head buffer and use buffer.

The head buffer 18 is used to facilitate freezing the first line of a basic block for loop and subroutine instructions. It is relatively small and is also organized as a FIFO register.

Alternately the prefetch buffer and/or the head buffer may be organized as least-recently-used (LRU) registers.

The use buffer 16 is used to reduce traffic on the system bus 20 by storing instructions which have been recently accessed by the processor in anticipation that they may be reused. It is preferably organized in a simple fashion to permit efficient use of chip area and may, for example, be a direct mapped cache with a large cache block size (i.e. a small cache tag area). It is also possible to implement the use buffer as a more complicated associative cache by trading off chip area for efficiency of operation.

When the processing unit 10 issues a memory request there are four possible situations which might occur:

If the requested instruction is already in the prefetch buffer 14 (i.e., if there is a prefetch buffer hit) the referenced instruction is sent to the processing unit 10 from the prefetch buffer 14 and the referenced instruction line is transferred to the use buffer 16 where it replaces any information previously stored in that line. After the referenced line is transferred to the use buffer, it is removed from the prefetch buffer.

If the instruction requested in already stored in the head buffer 18 the referenced instruction is sent from the head buffer to the processing unit 10. There is no further information transfer among the three buffers.

If the referenced instruction is already stored in the use buffer 16 the referenced instruction is sent from the use buffer 16 to the processing unit 10. There is no further information transfer among the three buffers.

If the referenced instruction is not found in any of the prefetch buffer, the use buffer, or the head buffer (i.e. there is a cache miss) a memory request for the referenced instruction is sent to the main memory 12 via system bus 20 with high priority. When the requested instruction arrives in the cache from main memory it is sent to the processor 10 and is also stored in either the head buffer 18 or the use buffer 16 in dependence on the outcome of a predefined test. If the instruction is stored in the head buffer it replaces the oldest code in that buffer and the replaced code is lost from the cache.

The tests which may be used to determine whether the instruction accessed from main memory is stored in the head buffer 18 or the use buffer 16 are typically based on a comparison of the address of the instruction accessed from memory with the address of the last instruction executed by the processing unit 10. In one embodiment of the test, the instruction fetched from memory is stored in the head buffer if it is non-sequential with the most recently executed instruction in the program counter. In a second embodiment of the test, the instruction fetched from main memory is only stored in the head buffer if it is non-sequential with respect to the previously executed instruction with a negative displacement which is larger than the size of the use buffer. In a third embodiment of the test, the instruction is only stored in the head buffer if it is non-sequential with the previously stored instruction with an absolute displacement which is greater than the size of the use buffer. In all cases, if the reference instruction is not stored in the head buffer it is stored in the use buffer.

Figure 2:
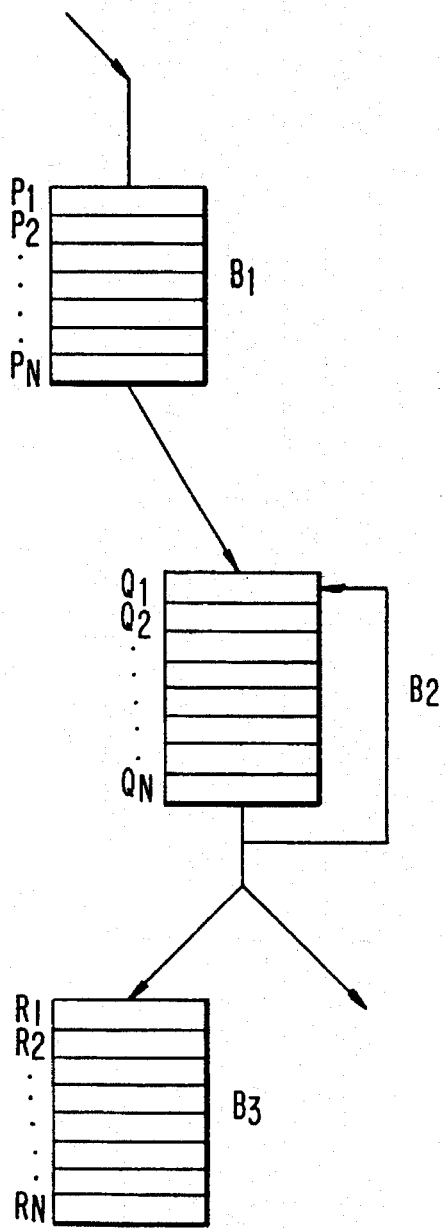
FIG. 2 illustrates the buffering of instructions in a computer program.

FIG. 2 illustrates the use of cache buffers in a typical program sequence which comprises block $B_1$ having sequential instructions $P_1$ through $P_n$, a second sequential block $B_2$ in the form of a loop having sequential instructions $R_1$ through $R_n$. In typical operation, the program $Q_1$ through $Q_n$ and a third block $B_3$ having sequential branches from some remote memory address to the first instruction $P_1$ of block $B_1$. If instruction line $P_1$ is not already in one of the three cache buffers it is stored in the head buffer 18. The instructions $P_1$ through $P_n$ in block $B_1$ execute thereafter in sequence and are prefetched from main memory 12 into the prefetch buffer 14 in a conventional manner. The instructions in the block are also stored in the use buffer 16 as they are sent from the prefetch buffer 14 to the CPU 10 but in the illustrated example they are not likely to be reused. At the end of block $B_1$ the program branches from instruction $P_n$ to instruction $Q_1$ at a non-sequential address. Instruction $Q_1$ represents the top of program block $B_2$ and is the entrance point for an instruction loop. Instruction $Q_1$ is not available from the prefetch buffer and is accessed from main memory via the bus and stored in the head buffer. Instructions $Q_1$ through $Q_n$ are then executed sequentially. They are prefetched from main memory by the prefetch buffer and are stored in the use buffer at the same time they are transferred to the CPU. The program branches back to instruction $Q_1$ at the end of block $B_2$. The branch is non-sequential but instruction $Q_1$ is in the head buffer since it is the first instruction in a recently executed block. If the length of the instruction sequence from $Q_2$ to $Q_n$ is no larger than the use buffer, those instructions are still in the use buffer after the first execution of the loop and may be accessed from the cache without further system bus transfers as long as the loop continues. At the end of the loop a branch is taken to block $B_3$. Instruction $R_1$ which is not in the cache is accessed from main memory and again stored in the head buffer 18.

In a simple embodiment, the prefetch buffer 14 operates continuously and thus places a steady traffic load on the bus 20. In a preferred embodiment of the system, the control unit 24 examines the contents of the three buffers to determine if the next sequential instruction to be prefetched is already in cache memory. If the instruction is already in the cache, prefetching is inhibited to reduce traffic on the bus 20.

In accordance with my above-mentioned patent application Ser. No. 500,612, the instruction set of the processor may include instructions termed "freeze" and "unfreeze" instruction which selectively allow or inhibit the overwriting of data in a cache memory. In a preferred embodiment of the invention a freeze instruction is implement via gate 22 to inhibit writing of new data into the use buffer 16 and head buffer 18 when the freeze instruction is active. When the use buffer and head buffer are frozen, the prefetch buffer continues to operate in it's usual manner (either continuously prefetching or prefetching depending on the contents of the cache memory) and the processor is still allowed to read data from the head buffer 18 and the use buffer 16.

Figure 3:
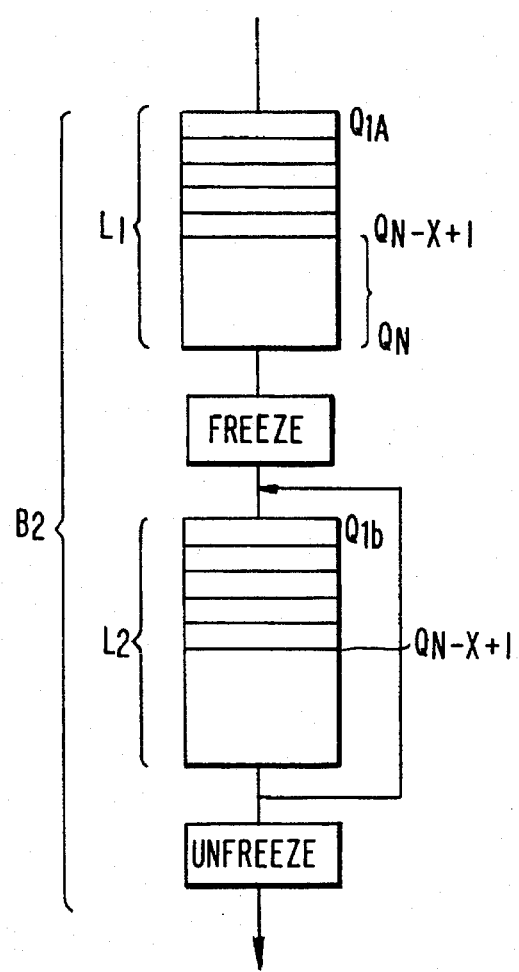
FIG. 3 illustrates the use of freeze and unfreeze instructions while executing a program loop.

FIG. 3 illustrates the typical use of a freeze instruction in a loop. A program loop, for example, block $B_2$ is compiled into two code sequences. The first sequence $L_1$ represents the first pass through the loop and the second sequence $L_2$ represents subsequent passes through the loop. During the first pass, instruction $Q_{1A}$ is stored in the head buffer and instructions are sequentially stored in the use buffer. If the use buffer is capable of holding X instructions and the loop segment $L_1$ is larger than X, at the end of the loop, (after the execution of instruction $Q_n$) the use buffer will hold instructions $Q_{n-x+1}$ through $Q_n$. At this point the compiler inserts a freeze instruction into the instruction stream which freezes the contents of the use buffer and the head buffer. The code proceeds to execute loop segment L2, but instruction $Q_1$ and $Q_{n-x+1}$ through $Q_n$ are already stored in the cache so that prefetching with its attendant bus traffic is only required between instructions $Q_2$ and $Q_{n-x}$. When the program leaves the loop, an unfreeze instruction is executed and the cache returns to its normal operation.

Although the invention has been described with respect to specific embodiments, those skilled in the are will recognize that it may easily be expanded or modified and the claims are intended to include such modifications and enhancements.

I claim:

1. A cache memory system for implementing the transfer of instruction codes from a main memory to a processing unit, said processing unit including a program counter the contents of which specify an address in the main memory which contains a next instruction code to be executed by said processing unit, comprising:

prefetch buffer means connected to prefetch and store instruction codes from addresses in the main memory which sequentially follow the addresses contained in the program counter;

a head buffer;

a use buffer; and instruction transfer control means responsive to the contents of the program counter, the prefetch buffer means, the head buffer, and the use buffer, which function so that:

a) if an instruction code specified by the program counter is in the prefetch buffer, said code is transmitted to the processing unit and is also stored in use buffer, b) if the instruction code specified by the program counter is in the head buffer or the use buffer, said code is transmitted to the processing unit; or c) if the instruction code specified by the program counter is not in any of the prefetch buffer means, the head buffer, or the use buffer, said code is fetched from the main memory, transmitted to the processing unit and also 1) stored in the head buffer if the contents of the program counter satisfy a predetermined test or 2) stored in the use buffer if the contents of the program counter do not meet the predetermined test.

2. The system of claim 1 wherein the instruction transfer control means further function to remove the code specified by the program counter from the prefetch buffer after said code is stored in the use buffer.

3. The system of claim 1 or 2 wherein the instruction transfer control means are responsive to an actual memory address specified by the contents of the program counter.

4. The system of claim 1 or 2 wherein the predetermined test is met if the memory address specified by the contents of the program counter is non-sequential with the address of the instruction last executed by the processing unit.

5. The system of claim 4 wherein the predetermined test is met if the memory address specified by the contents of the program counter is absolutely displaced from the address of the instruction last executed by the processing unit by an amount which is greater than the size of the use buffer.

6. The system of claim 4 wherein the predetermined test is met if the memory address specified by the contents of the program counter is negatively displaced from the address of the instruction last executed by the processing unit by an amount which is greater than the size of the use buffer.

7. The system of claim 1 or 2 wherein the prefetch buffer means continuously prefetches instruction codes from sequential addresses in the main memory.

8. The system of claim 1 or 2 further comprising prefetch control means connected to the prefetch buffer means, the head buffer and the use buffer which inhibit prefetching of instruction codes from main memory addresses if a requested instruction code is already in any of the prefetch buffer means, the head buffer or the use buffer.

9. The system of claim 1 or 2 wherein the prefetch buffer means is organized as a first-in-first-out buffer.

10. The system of claim 1 or 2 wherein the prefetch buffer is organized as a least-recently-used buffer.

11. The system of claim 1 or 2 wherein the head buffer is organized as a first-in-first-out buffer.

12. The system of claim 1 or 2 wherein the head buffer is organized as a least-recently-used buffer.

13. The system of claim 1 or 2 wherein the use buffer is organized as a direct-mapped cache buffer.

14. The system of claim 1 or 2 wherein the use buffer is organized as a associative cache buffer.

15. The system of claim 1 or 2 wherein the use buffer is larger than the prefetch buffer and than the head buffer.

16. The system of claim 1 or 2 further comprising cache freezing means which controllably inhibit data transfer into the use buffer and the head buffer in response to predefined instruction codes processed by the processing unit.

17. The system of claim 15 in combination with instruction compiler means which generate instruction code loops as: first a first block of sequential instructions which specify a first iteration of a loop, then a freeze instruction code which inhibits transfer into the use buffer and the head buffer, then a second block of instructions which implement further iterations of the loop, and then an unfreeze instruction code which permits data transfer into the use buffer and the head buffer.

18. A method for operating a computer for implementing the transfer of instruction codes from a main memory to a processing unit, said processing unit including a program counter the contents of which specify an address in the main memory which contains a next instruction code to be executed by said processing unit, comprising:

providing a cache with a prefetch buffer, a head buffer and a use buffer;

prefetching and storing in the prefetch buffer, instruction codes from addresses in the main memory which sequentially follow the addresses contained in the program counter;

if an instruction code specified by the program counter is in the prefetch buffer, transmitting said code to the processing unit and also storing said code in the use buffer, if the instruction code specified by the program counter is in the head buffer or the use buffer, transmitting said code to the processing unit;

if the instruction code specified by the program counter is not in any of the prefetch buffer, the head buffer, and the use buffer, fetching said code from the main memory, transmitting said code to the processing unit and also 1) storing said code in the head buffer if the contents of the program counter satisfy a predetermined test or 2) storing said code in the use buffer if the contents of the program counter do not meet the predetermined test.

19. The method of claim 18 wherein, if the instruction code specified by the program counter is in the prefetch buffer the method further comprises the step of removing said code from the prefetch buffer after it is stored in the use buffer.

20. The method of claim 18 or 19 wherein the predetermined test is met if the memory address specified by the contents of the program counter is non-sequential with the address of the instruction last executed by the processing unit.

21. The method of claim 18 or 19 wherein the predetermined test is met if the memory address specified by the contents of the program counter is displaced from the address of the instruction last executed by the processing unit by an amount which is greater than the size of the use buffer.

22. The method of claim 21 wherein the predetermined test is met if the memory address specified by the contents of the program counter is negatively displaced from the address of the instruction last executed by the processing unit by an amount which is greater than the size of the use buffer.

23. The method of claim 18 or 19 wherein the step of prefetching comprises continuously prefetching instruction codes from sequential addresses in the main memory.

24. The method of claim 18 or 19 further comprising the step of inhibiting prefetching of instruction codes from main memory addresses if a requested instruction code is already in any of the prefetch buffer means, the head buffer or the use buffer.

25. The method of claim 18 or 19 wherein prefetching includes the step of replacing the contents of the prefetch buffer on a first-in-first-out basis.

26. The system of claim 18 or 19 wherein the step of storing code in the head buffer comprises replacing data in the head buffer on a first-in,-.first-out basis.

27. The method of claim 18 or 19 further comprising the step of controllably inhibiting data transfer into the use buffer and the head buffer in response to predefined instruction codes processed by the processing unit.

28. The method of claim 18 or 19 wherein the step of storing code in the head buffer comprises replacing data in the head buffer on a least-recently-used basis.

29. The method of claim 18 wherein the step of replacing code in the prefetch buffer comprises replacing code in the prefetch buffer on a least-recently-used basis.

30. A microprocessor integrated circuit including a cache memory system for implementing the transfer of instruction codes from a main memory which contains a next instruction code to be executed the processing unit, comprising:

prefetch buffer means connected to prefetch and store instruction codes from addresses in the main memory which sequentially follow the addresses contained in the program counter;

a head buffer;

a use buffer; and instruction transfer control means responsive to the contents of the program counter, the prefetch buffer means, the head buffer and the user buffer, which function so that:

a) if an instruction code specified by the program counter is in the prefetch buffer, the code is transmitted to the processing unit and is also stored in the use buffer, b) if the instruction code specified by the program counter is in the head buffer or the use buffer, the code is transmitted to the processing unit; or c) if the instruction code specified by the program counter is not in any of the prefetch buffer means, the head buffer or the use buffer, the code is fetched from the main memory, transmitted to the processing unit and also 1) stored in the head buffer if the contents of the program counter satisfy a predetermined test or 2) stored in the use buffer if the contents of the program counter do not meet the predetermined test.

31. The microprocessor integrated circuit of claim 30, wherein the instruction transfer control means further function to remove the code specified by the program counter from the prefetch buffer after the code is stored in the use buffer.

* * * * *